United States Patent
Pallares Lopez et al.

(10) Patent No.: US 9,344,923 B2
(45) Date of Patent: May 17, 2016

(54) SERVERS AND METHODS FOR HANDOVER BETWEEN TWO SERVING CALL CONTROL SERVERS

(75) Inventors: Miguel Angel Pallares Lopez, Madrid (ES); Evaristo Jose Camarero, Madrid (ES); Luis López Soria, Madrid (ES); Maria-Carmen Belinchon Vergara, Getafe (ES); Robert Khello, Norsborg (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1628 days.

(21) Appl. No.: 11/573,672

(22) PCT Filed: Aug. 13, 2004

(86) PCT No.: PCT/SE2004/001202
§ 371 (c)(1),
(2), (4) Date: Feb. 13, 2007

(87) PCT Pub. No.: WO2006/016839
PCT Pub. Date: Feb. 16, 2006

(65) Prior Publication Data
US 2007/0207805 A1  Sep. 6, 2007

(51) Int. Cl.
*H04W 36/00* (2009.01)
*H04W 8/18* (2009.01)
*H04W 80/10* (2009.01)

(52) U.S. Cl.
CPC ............ *H04W 36/0033* (2013.01); *H04W 8/18* (2013.01); *H04W 80/10* (2013.01)

(58) Field of Classification Search
USPC .................... 455/439, 436; 370/331
See application file for complete search history.

(56) References Cited

U.S. PATENT DOCUMENTS

2004/0266426 A1* 12/2004 Marsh et al. ............... 455/426.2

FOREIGN PATENT DOCUMENTS

| JP | 2003-244191 A | | 1/2003 | |
|---|---|---|---|---|
| WO | WO 02/091786 | * | 11/2002 | .............. H04Q 7/38 |
| WO | WO 02/091786 A | | 11/2002 | |
| WO | WO 03/061236 | * | 7/2003 | .............. H04L 29/06 |
| WO | WO 03/061236 A | | 7/2003 | |

OTHER PUBLICATIONS

3GPP TS 23.002 V5.12.0; 3rd Generation Partnership Project; Technical Specification Group Services and Systems Aspects; Network architecture (Release 5); Sep. 2003.
(Continued)

*Primary Examiner* — Michael Faragalla

(57) ABSTRACT

The present invention is aimed to carry out an effective handover between a first and a second serving call control servers in order to fit suitable server capabilities for servicing a user, as well as to provide a mechanism whereby a subscriber server may upgrade the selection criteria for assigning the second serving call control server. Therefore, the present invention provides a new method and enhanced servers for re-assigning the second serving call control server, whereby the still ongoing sessions for the user in the first serving call control server are kept alive, and where a serving call control server is arranged to report towards the subscriber server what portions of a user profile are not understood or not supported at said serving call control server.

20 Claims, 13 Drawing Sheets

(56) References Cited

OTHER PUBLICATIONS

3GPP TS 23.228 V5.11.0; 3rd Generation Partnership Project; Technical Specification Group Services and Systems Aspects; IP Multimedia Subsystem (IMS); Stage 2 (Release 5); Dec. 2003.

3GPP TS 29.228 V5.6.0; 3rd Generation Partnership Project; Technical Specification Group Core Network; IP Multimedia (IM) Subsystem Cx and Dx interfaces; Signalling flows and message contents (Release 5); Dec. 2003.

3GPP TS 29.229 V5.6.0; 3rd Generation Partnership Project; Technical Specification Group Core Network; Cx and Dx interfaces based on the Diameter protocol; Protocol details (Release 5); Dec. 2003.

XML Path Language (XPath); Version 1.0; W3C Recommendation; http://www.23.org/TR/xpath; Nov. 16, 1999.

XML Schema Part 1: Structures Second Edition; W3C Recommendation; http://www.w3.org/TR/xmlschema-1/: Oct. 28, 2004.

Calhoun, et al.; Network Working Group; Request for Comments: 3588; Diameter Base Protocol; Sep. 2003.

3GPP TS 29.228 V5.3.0; 3rd Generation Partnership Project; Technical Specification Group Core Network; IP Multimedia (IM) Subsystem Cx and Dx interfaces; Signalling flows and message contents; (Release 5); Mar. 2003.

* cited by examiner

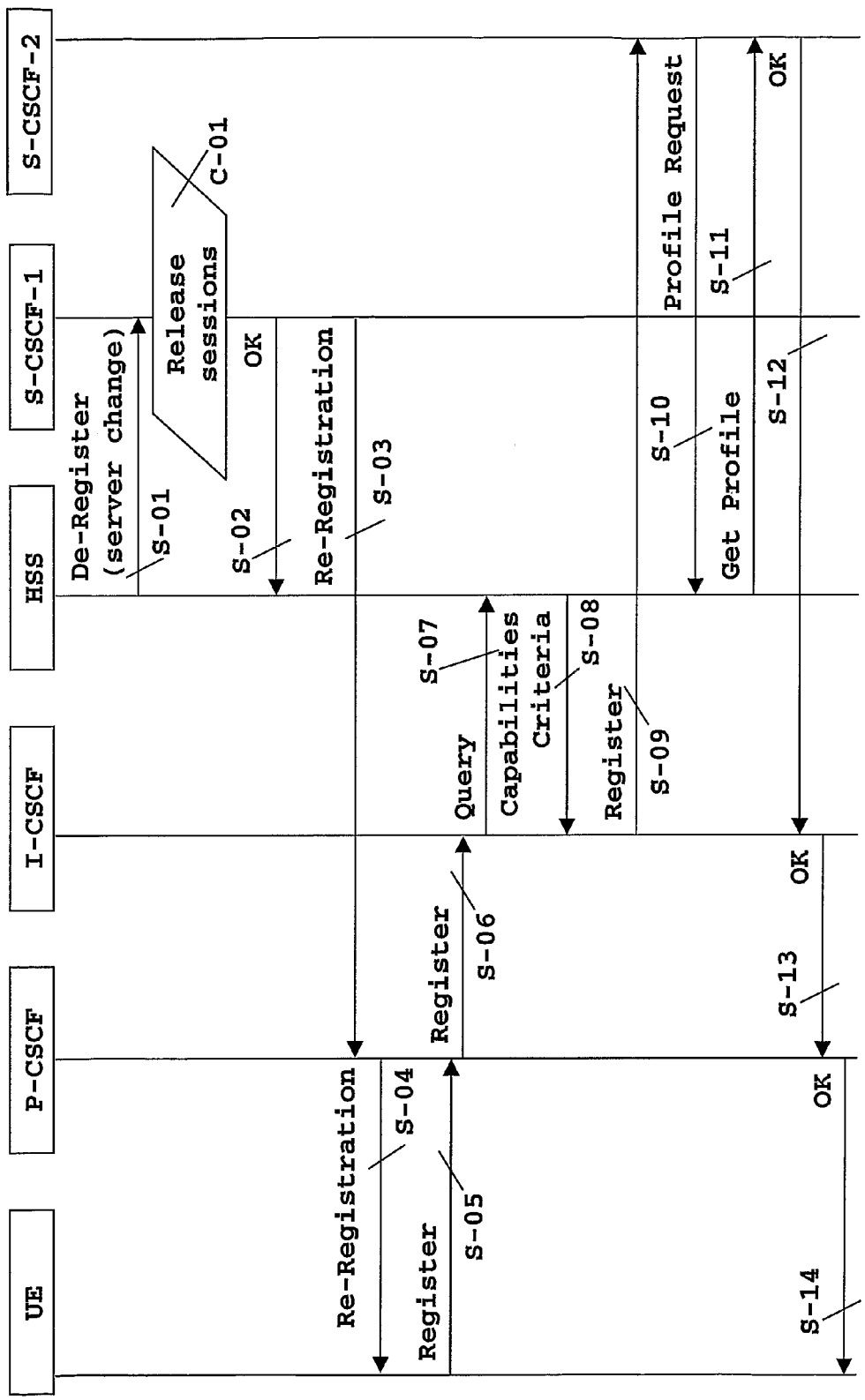
FIG.-1-
Prior Art

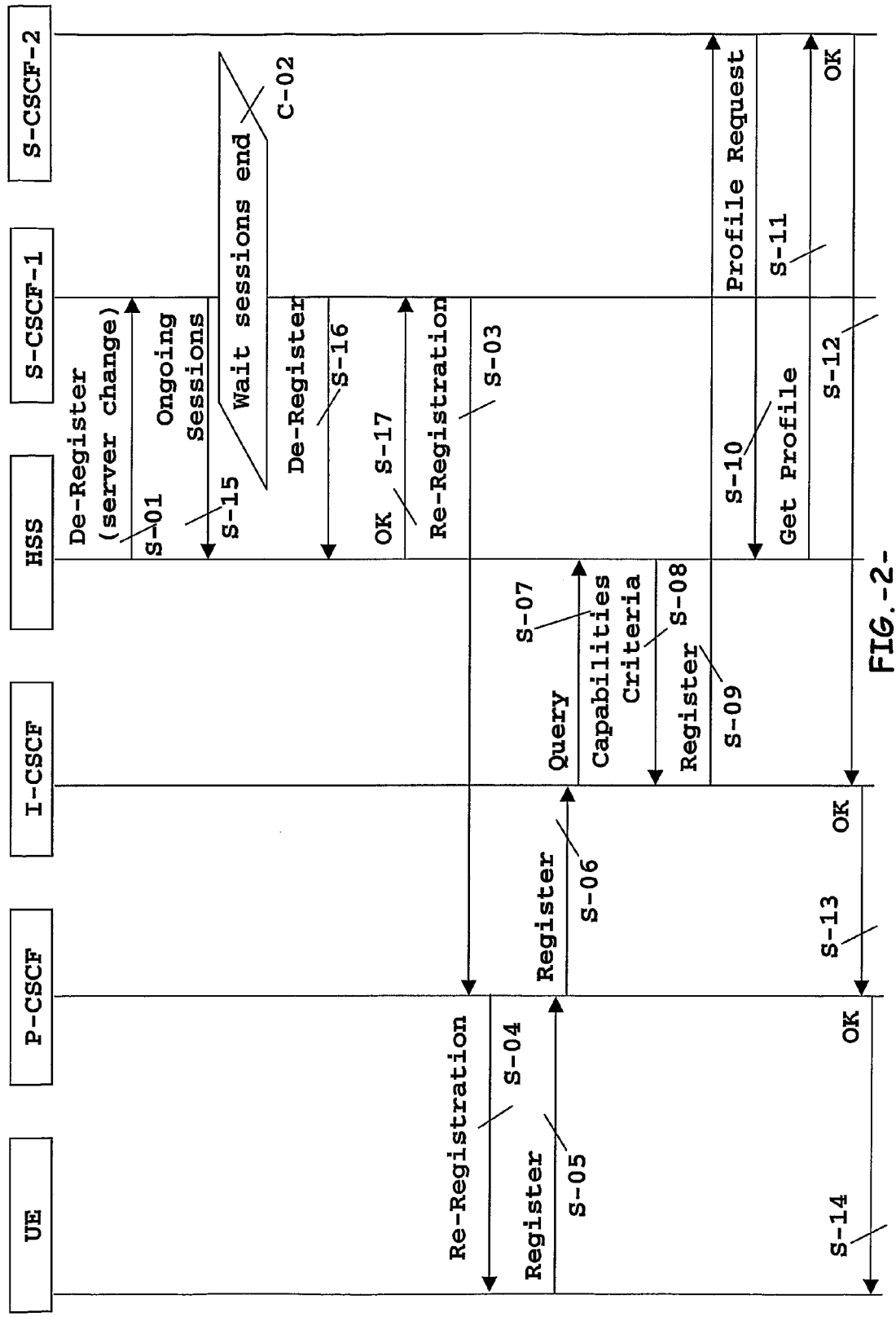
FIG.-2-

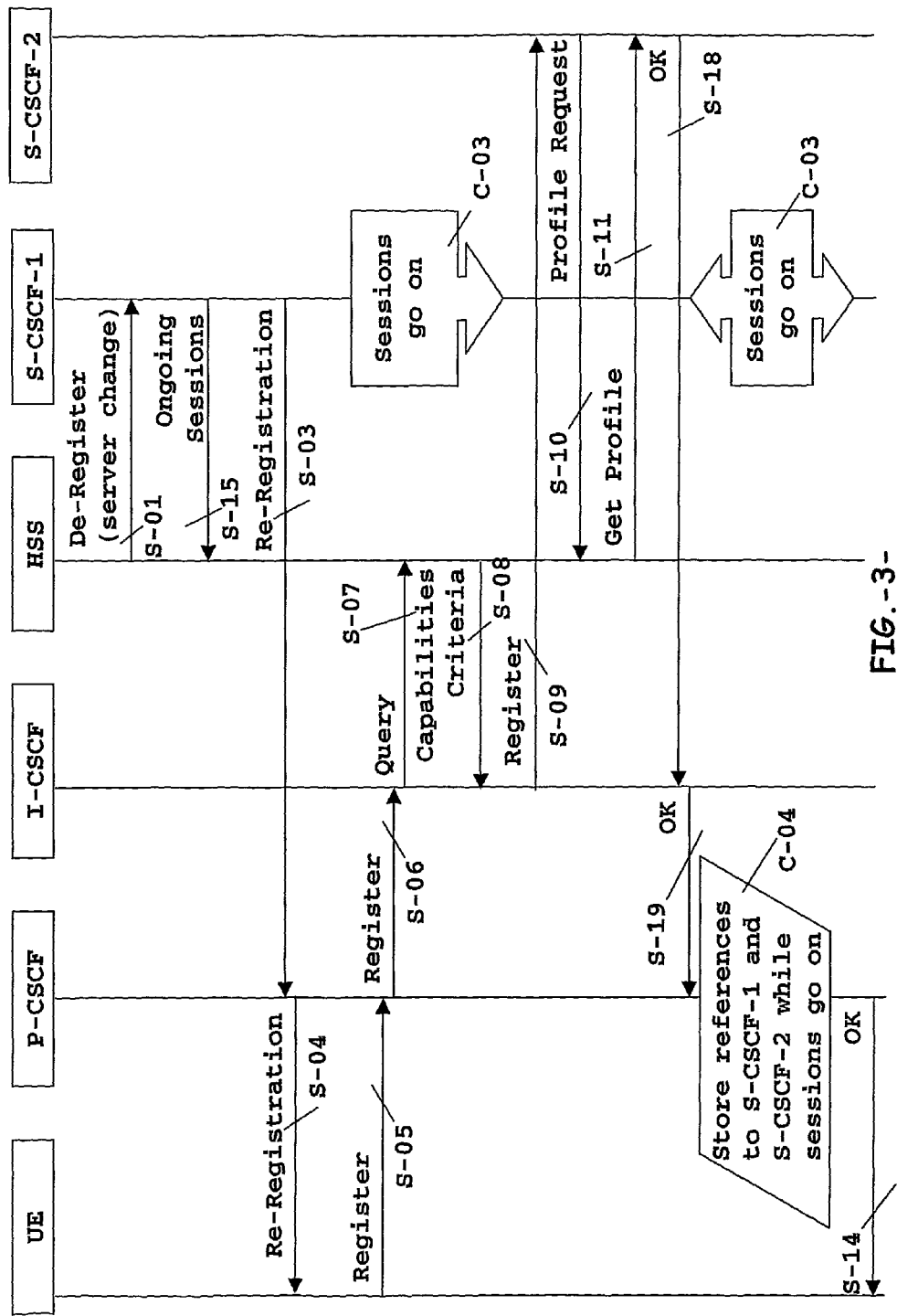
FIG.-3-

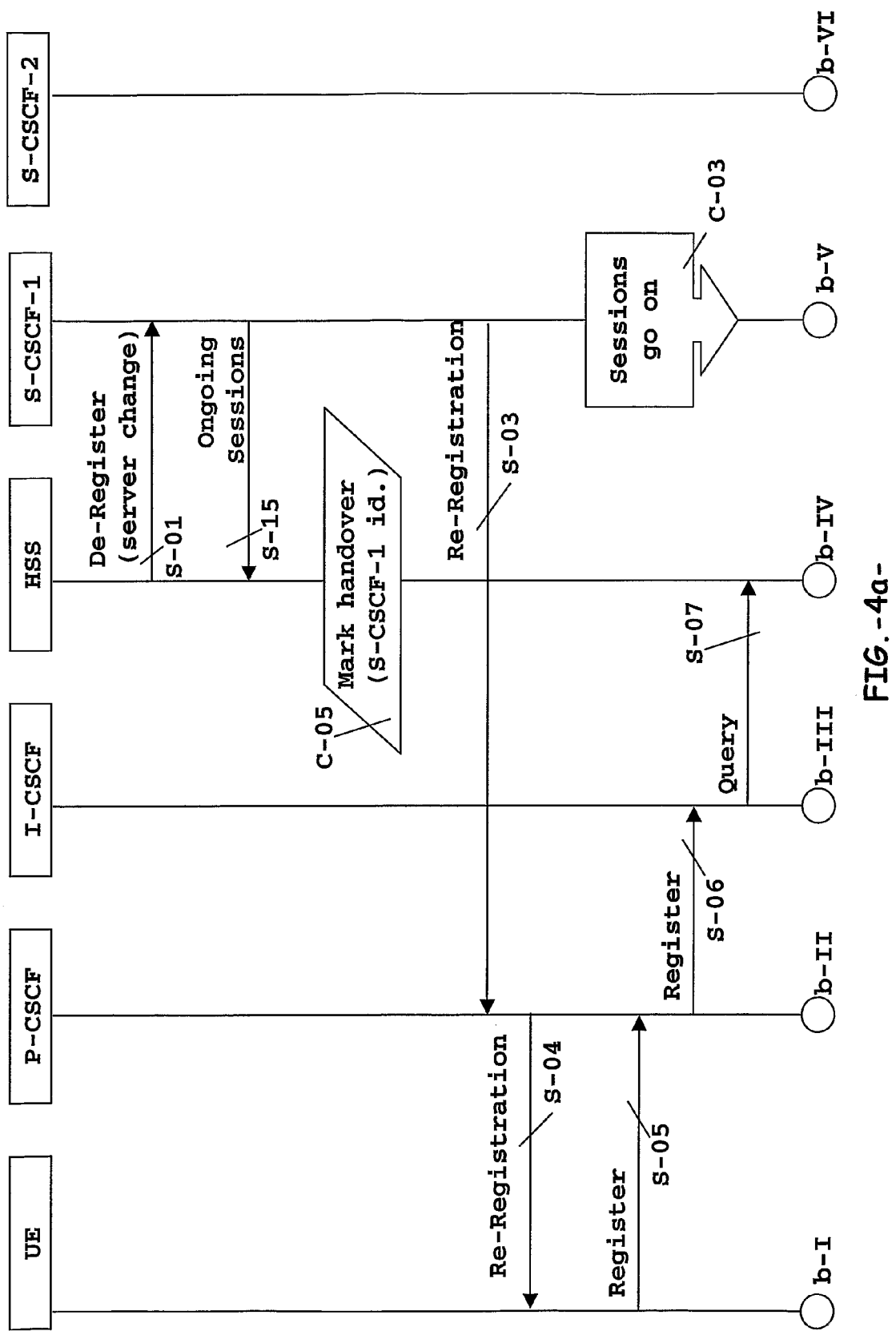

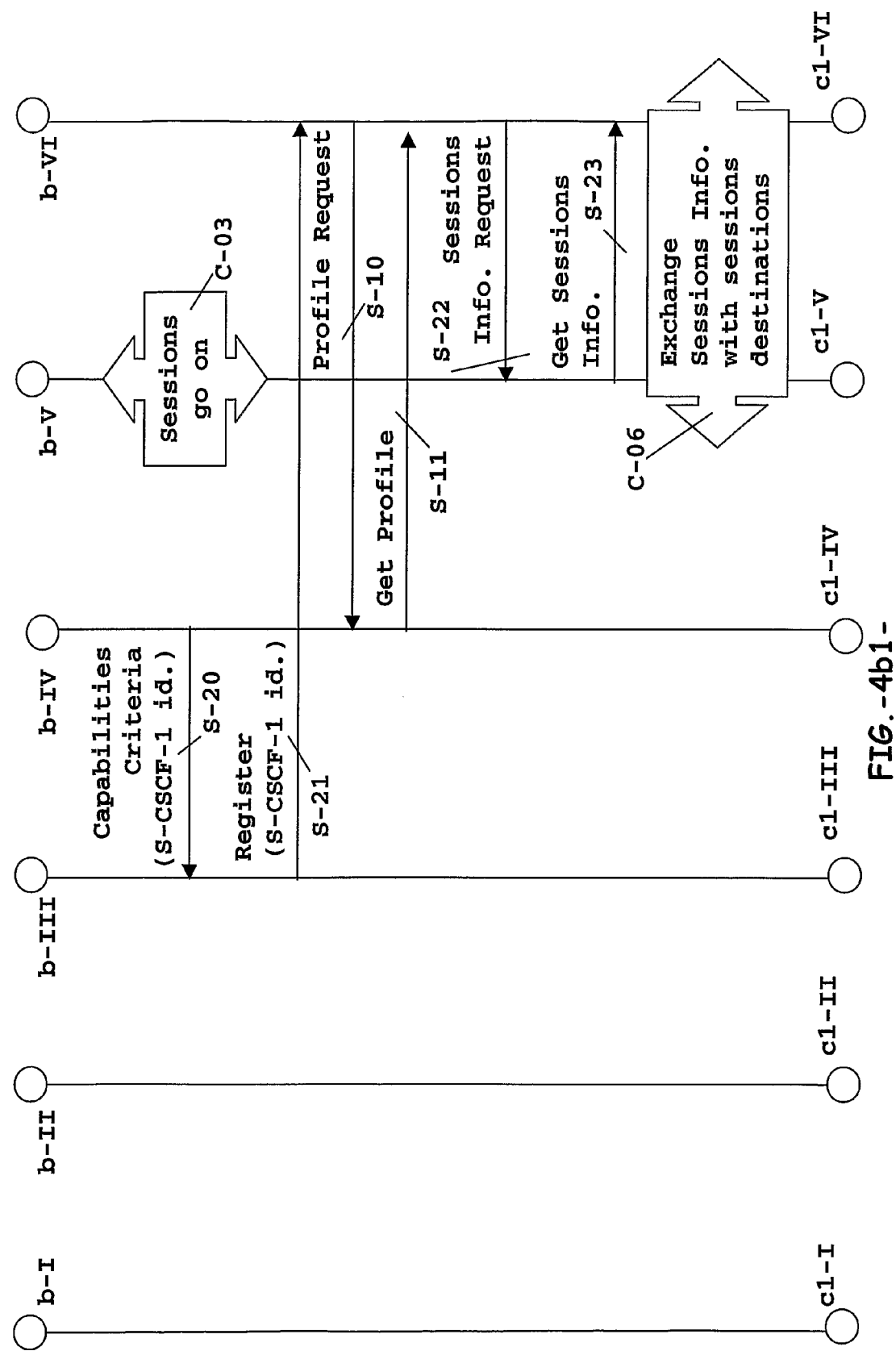
FIG.-4b1-

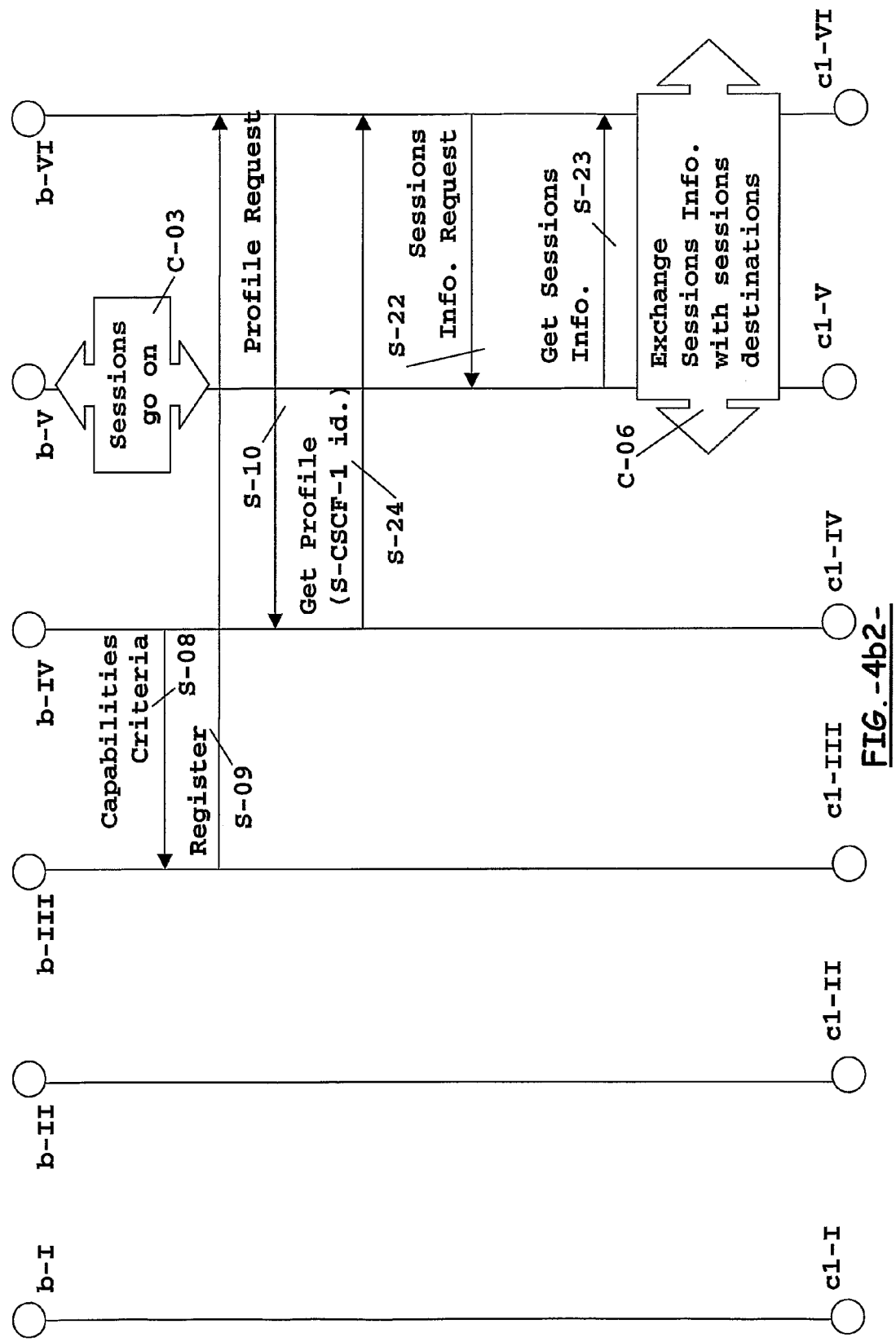
FIG. -4b2-

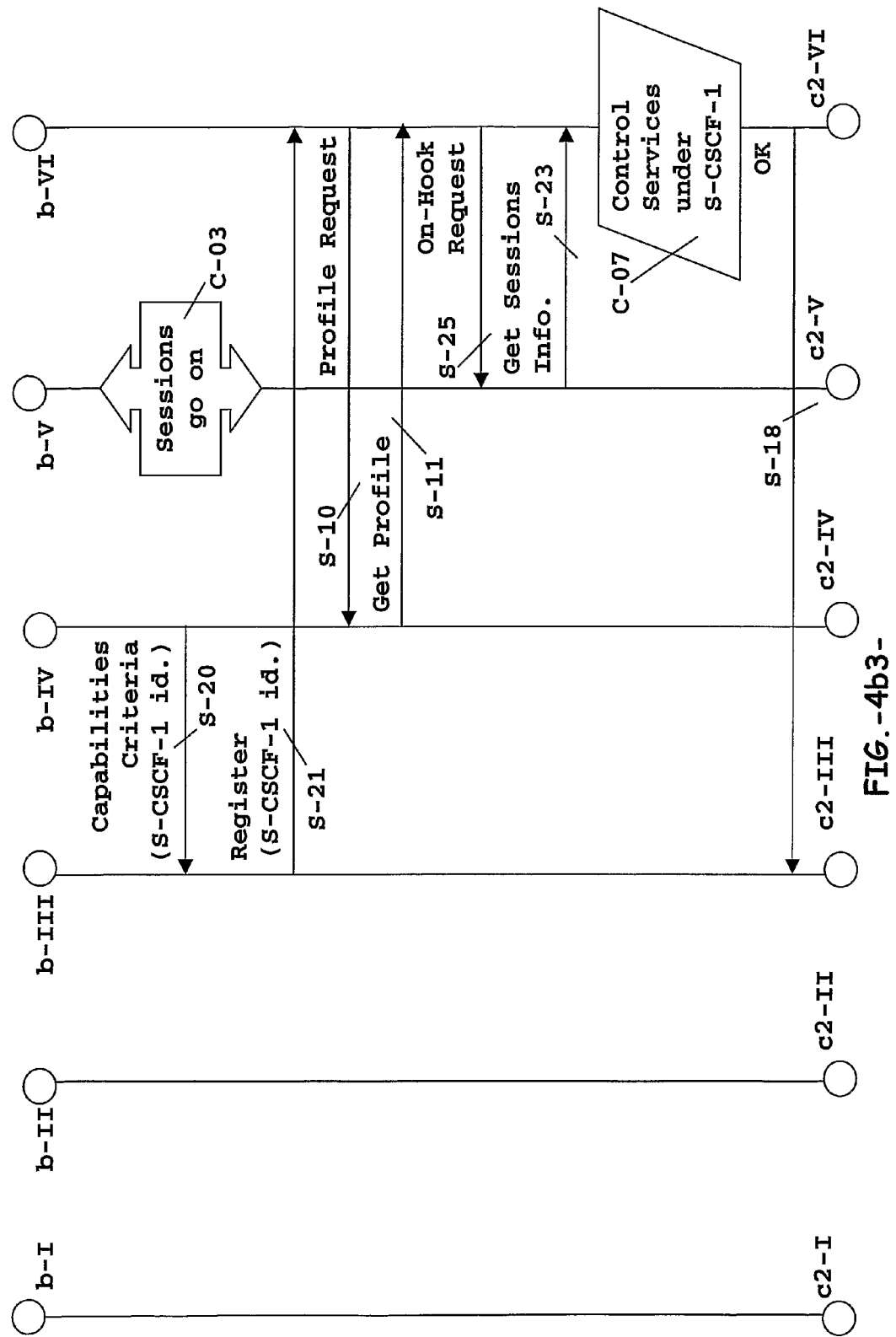
FIG.-4b3-

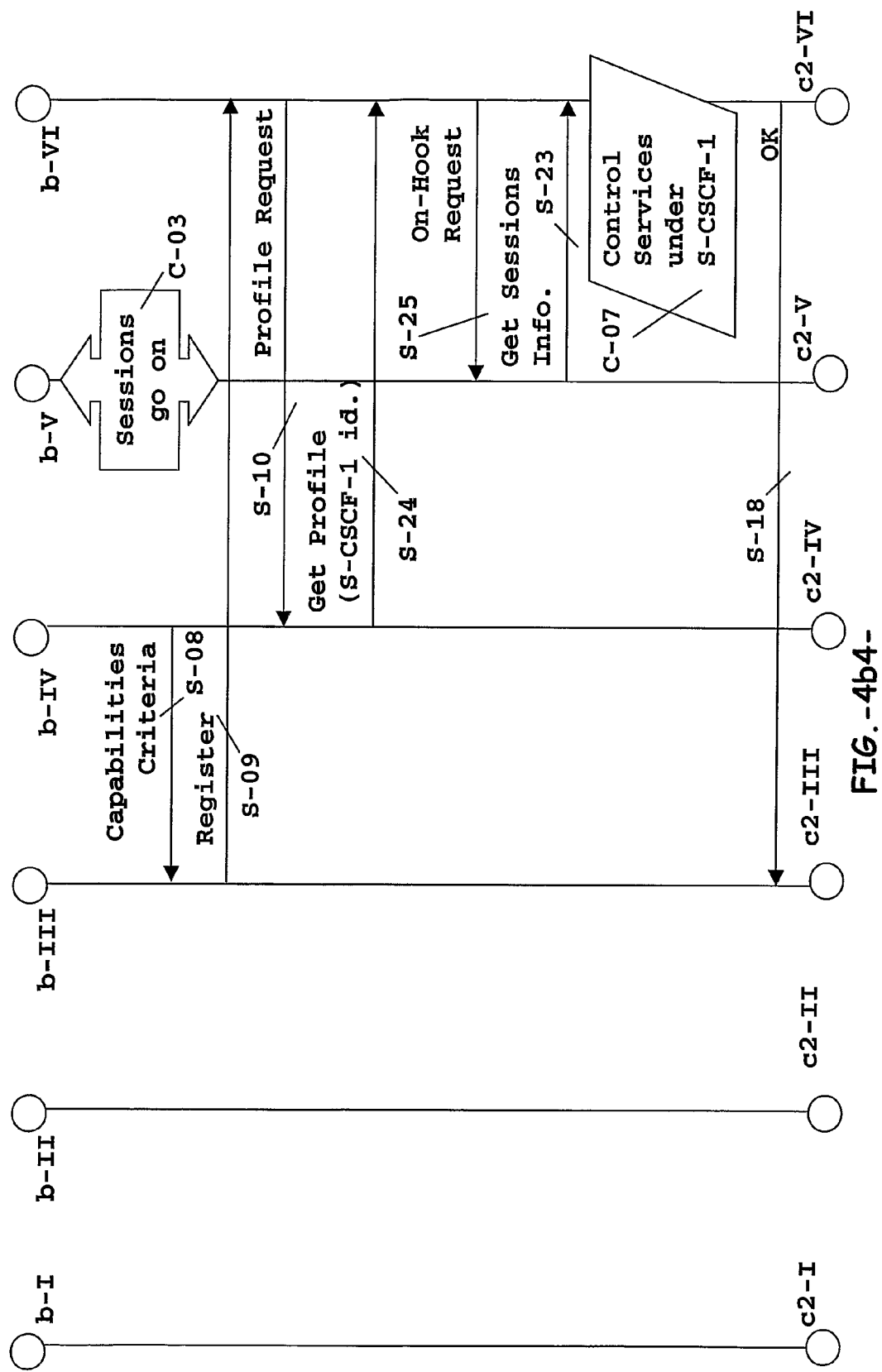
FIG.-4b4-

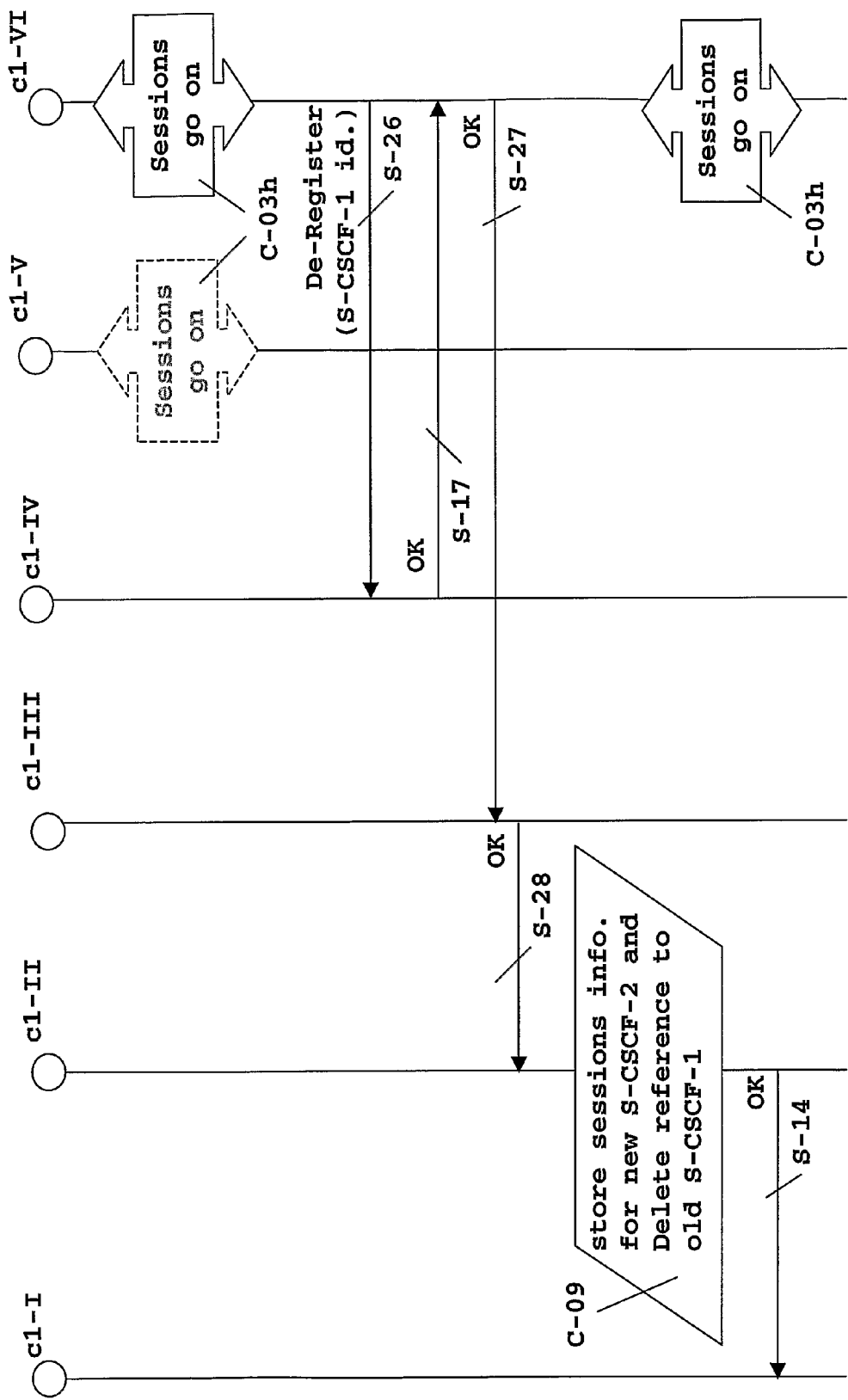
FIG.-4c1-

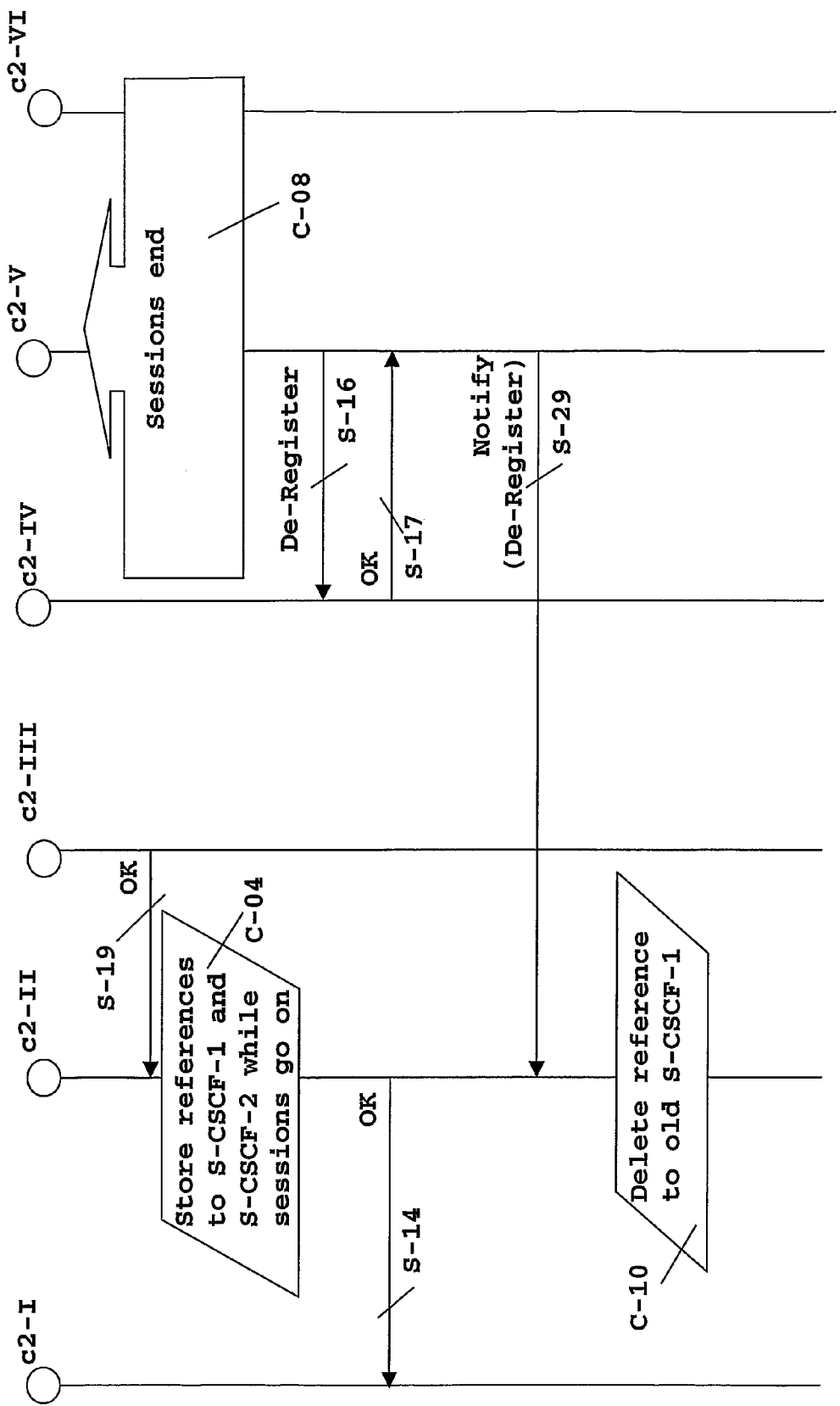
FIG.-4c2-

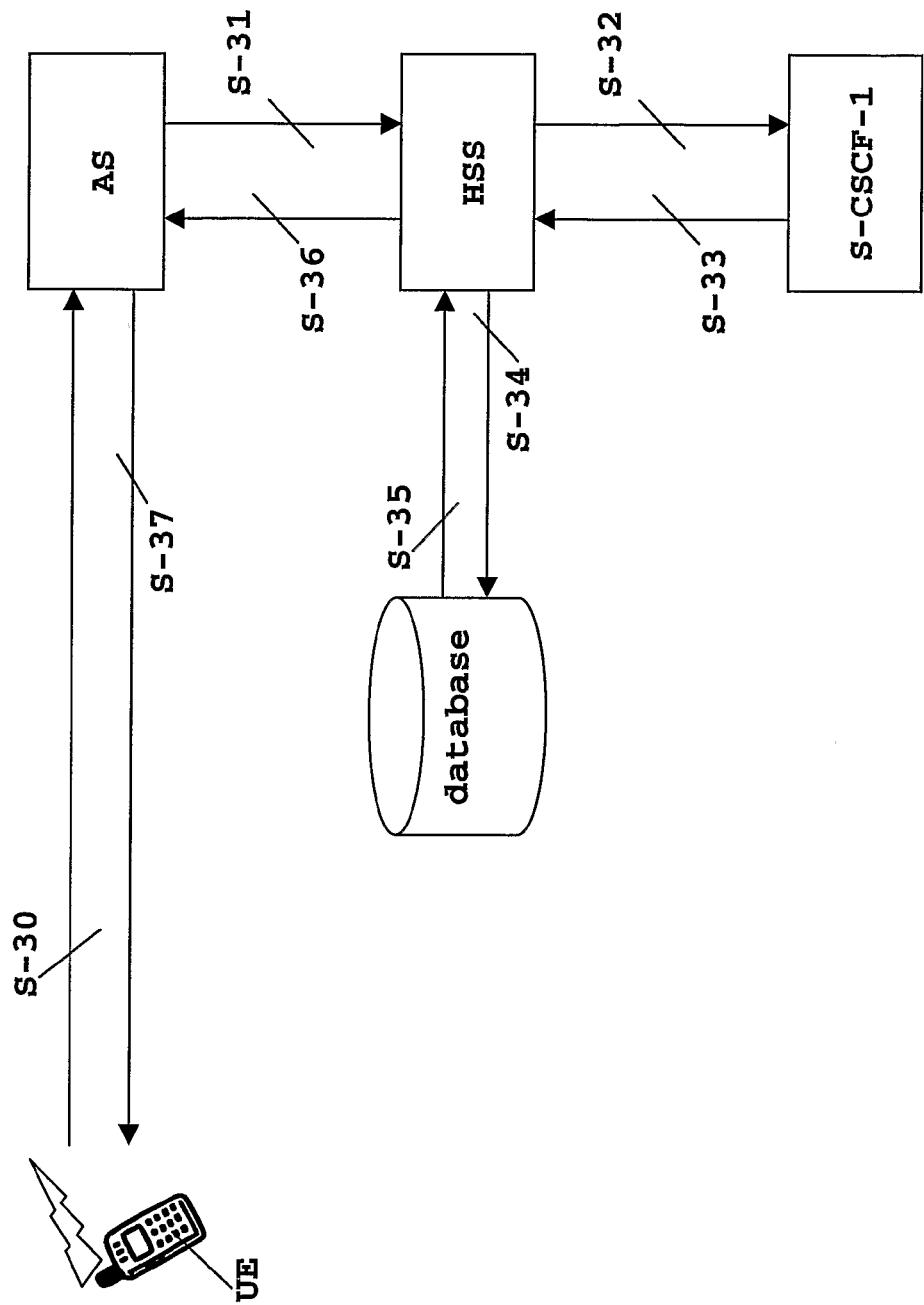
FIG. -5-

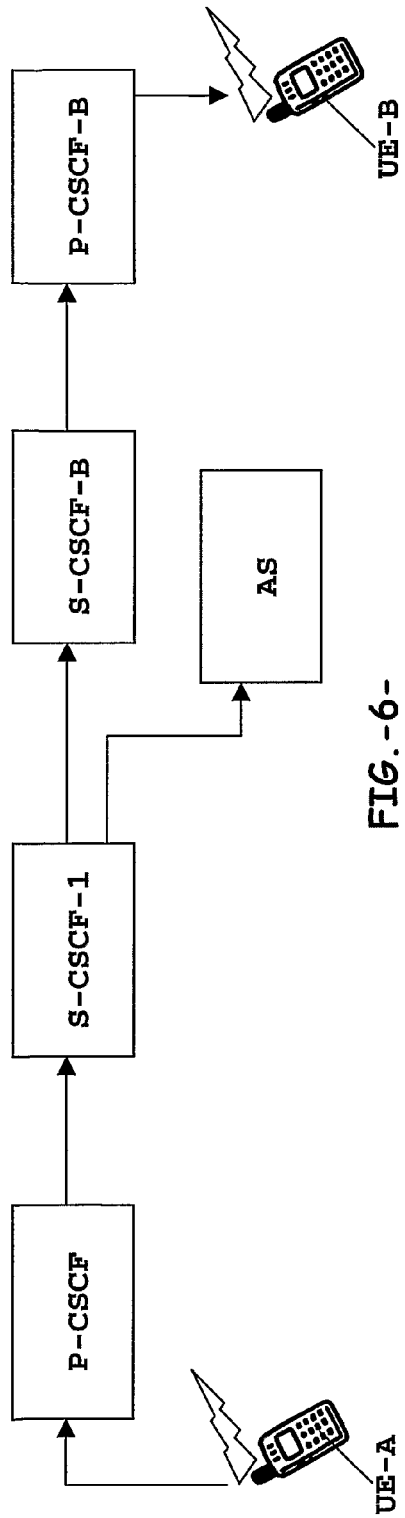
FIG. -6-
Prior Art
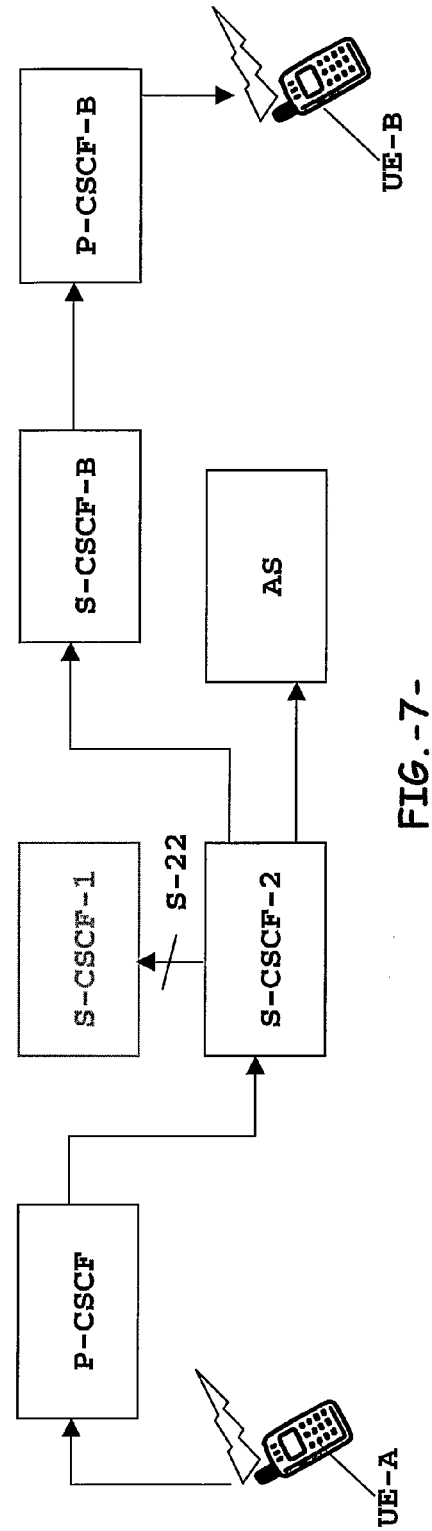
FIG. -7-

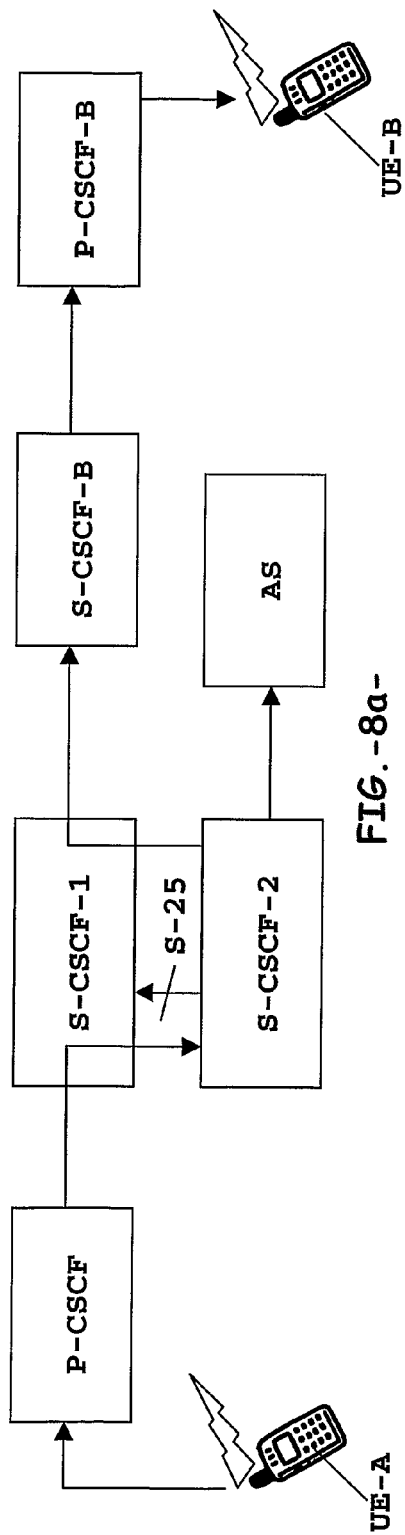
FIG.-8a-
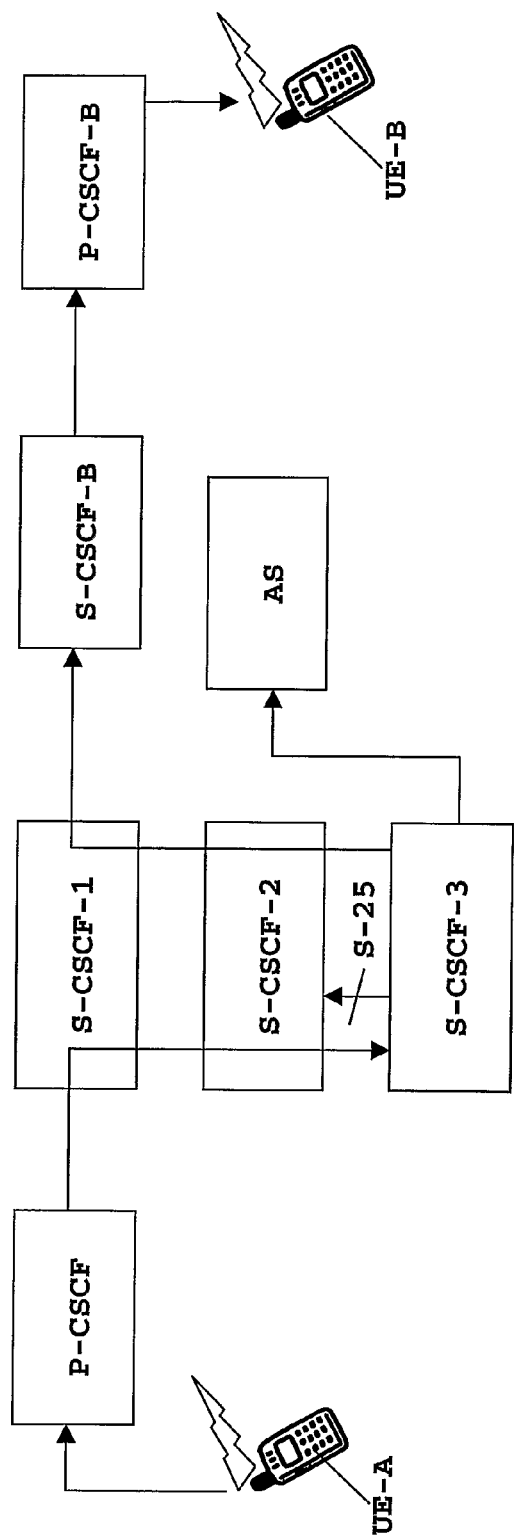
FIG.-8b-

SERVERS AND METHODS FOR HANDOVER BETWEEN TWO SERVING CALL CONTROL SERVERS

FIELD OF THE INVENTION

The present invention generally relates to handover between a first and a second serving call control server assigned for servicing a user when the first serving call control server is found not to have suitable capabilities for servicing the user. In particular, the present invention also relates to a mechanism whereby unsupported capabilities of a serving call control server are reported.

BACKGROUND

Many of presently existing mobile networks, as well as possibly future telecommunication networks being defined by standardisation bodies, require end-users with respective user equipments being serviced by serving call control servers of said telecommunication networks. In this respect, when a user attaches to an exemplary telecommunication network operating in accordance with an IP Multimedia Subsystem (IMS), as defined by 3GPP and 3GPP2 standards, by explicitly registering in the telecommunication network, a specific serving call control server is assigned by the network for servicing the user, or rather the user equipment. For the sake of simplicity, both user and user equipment share a same abbreviation "UE" and reference throughout the present specification and drawings.

The assignment of a serving call control server is performed by another entity of the telecommunication network in view of a list of capabilities required in order to fit a number of information elements in a user profile for the user. Said another entity is preferably an intermediate server to be consulted about the user by an access server where the user accesses the telecommunication network through.

At present, in a currently existing architecture for the above IP Multimedia Subsystem (hereinafter referred to as IMS) specified by the $3^{rd}$ Generation Partnership Project (3GPP), a user (UE) accesses the IMS through a Proxy Call State Control Function (P-CSCF) that asks an Interrogating Call State Control Function (I-CSCF) about the user. The latter consults with a Home Subscriber Server (HSS) in order to obtain a user profile for the user including a number of information elements that serve as criteria for assigning one or another Serving Call State Control Function (S-CSCF), namely the one which offers a required set of specific capabilities for servicing the user (UE).

Apart from the above Call State Control Function entities (P-CSCF, I-CSCF, S-CSCF), an IMS likely includes a plurality of Application Servers (AS) for offering dedicated services to the user. The interactions between the IMS entities and the Application Servers (AS) are governed by triggers, which act on signalling of a Session Initiation Protocol (SIP). Such triggers are part of the user profile stored in the Home Subscriber Server (HSS) and are downloaded to the Serving Call State Control Function (S-CSCF) during a SIP registration of the user (UE). Moreover, such triggers determine the specific Application Server (AS) where a SIP message has to be forwarded when the trigger conditions are met.

In short, the user profile generally comprises a number of information elements wherein a portion thereof represents a set of capabilities that a Serving Call State Control Function entity (S-CSCF) should mostly fulfil for being assigned to the user (UE), whereas another portion thereof represents a set of triggers that the Serving Call State Control Function entity (S-CSCF) applies to determine a specific Application Server (AS) for offering a dedicated service to the user. Moreover, a user profile may include as well another portion of information elements representing authorization for certain services, such as a list of so-called "codec" authorized for the user. Furthermore, a user profile might also include another portion of information elements utilizable for charging and other purposes. In principle, there is no reason to preclude that any of these information elements is utilizable for more than one of the above purposes. More particularly, the user profile may include standardized information elements, namely well-known structured or unstructured elements, as well as proprietary or non-standard information elements of a different nature.

Under currently applicable specifications for IMS, the user profile may be submitted from the Home Subscriber Server (HSS) to the Serving Call State Control Function entity (S-CSCF) upon initiative taken either by the former or by the latter. In a first scenario, for instance, when a user profile is updated in the Home Subscriber Server (HSS) by the telecommunication network operator, for example by adding or deleting triggers, the Home Subscriber Server (HSS) pushes towards the Serving Call State Control Function entity (S-CSCF) a download of the user profile. In a second scenario, also for instance, when a user has been assigned a Serving Call State Control Function entity (S-CSCF) by the Interrogating Call State Control Function entity (I-CSCF), the former requests towards the Home Subscriber Server (HSS) a download of a user profile for the user.

Thus, in an exemplary telecommunication network operating in accordance with an IP Multimedia Subsystem (IMS) for the purpose of the present invention, a user (UE) accesses the network through an access server, namely a proxy call control server (P-CSCF) in this instant specification. The proxy call control server (P-CSCF) communicates with an intermediate network server (I-CSCF) that is coupled with a subscriber server (HSS), the latter being in charge of a user profile for the user. The intermediate network server (I-CSCF) selects an appropriate serving call control server (S-CSCF) for servicing the user based on server capabilities derivable from information elements included in the user profile, and assigns said serving call control server (S-CSCF) to the user. Then, the assigned serving call control server (S-CSCF) requests a download of the user profile to the subscriber server (HSS) coupled with the intermediate network server (I-CSCF).

At present, within the above mechanism as well as when the subscriber server (HSS) pushes on its own the download of the user profile, the serving call control server (S-CSCF) can only either accept the contents of the user profile as they are, or reject both the user profile and servicing to the user. In particular, and taking into account that a user profile may include proprietary or non-standard information elements, a serving call control server (S-CSCF) might under some circumstances accept the user profile with non-understandable information elements, and might present an unexpected behaviour without the operator being aware of. In this respect, there is almost no difference on whether the download of the user profile has been pushed by the subscriber server (HSS) on its own, or requested by the serving call control server (S-CSCF).

For example, a user (UE) might have accessed the telecommunication network through a proxy call control server (P-CSCF), and be assigned a serving call control server (S-CSCF) suitable for fitting the capabilities required for servicing the user accordingly with information elements in a user profile for that user. At a certain time the user might be served by a specific Application Server (AS) offering the user an upgrade of the user's terminal by downloading some software prepared to this end. As a result of this download the subscriber server (HSS) in charge of user profiles is informed and some information elements in the user profile for the user are accordingly updated. The subscriber server (HSS) pushes on its own a download of the updated user profile towards the serving call control server (S-CSCF) currently assigned for servicing the user. The new or updated user profile is analyzed by the serving call control server (S-CSCF) and, provided that any information element is not understood or not supported, said serving call control server (S-CSCF) may either reject the user profile, or follow a "best effort" practice in order to service the user in the best possible manner. As rejecting the user profile, the subscriber server (HSS) may assume that another serving call control server (S-CSCF) should likely be selected, however, the subscriber server may be not fully aware of what new capabilities should be included as selection criteria. On the other hand, when the "best effort" practice is followed by the serving call control server (S-CSCF) the situation is even worse since the subscriber server (HSS) does not even know about a misleading behaviour at said serving call control server (S-CSCF).

In this exemplary scenario, the subscriber server might try to select another serving call control server (S-CSCF), at least when the user profile is rejected, based on the updated information elements that had resulted from the upgrading download carried out by the user. Therefore, upon selection of a second serving call control server (S-CSCF-2), a handover between a previously assigned first serving call control server (S-CSCF-1) and the more suitable second serving call control server (S-CSCF-2) is carried out by de-registering the first serving call control server (S-CSCF-1) while finishing all ongoing sessions in said first serving call control server (S-CSCF-1), and registering the second serving call control server (S-CSCF-2).

This de-registration followed by a new registration of a serving call control server (S-CSCF) is accompanied by a forced termination of ongoing sessions. This procedure may be regarded as a weak network response and a drawback that the present invention is aimed to solve.

Thereby, an object of the present invention is the provision of means and method to improve the currently existing handover between a first and a second serving call control servers in order to better fit the required server capabilities for servicing a user.

In a second exemplary scenario where a first serving call control server (S-CSCF-1) has been selected and assigned for a user, this assigned first serving call control server (S-CSCF-1) requests the download of the user profile to the subscriber server (HSS) as already commented above. Provided that there is any network configuration trouble, the assigned first serving call control server (S-CSCF-1) might encounter unsupported or non-understandable information elements that make it reject the user profile. In this situation, the subscriber server (HSS) has no means to establish new selection criteria for selecting and assigning a second serving call control server (S-CSCF-2) other than the previous ones that addressed the first serving call control server (S-CSCF-1), and which is now found unsuitable.

Therefore, a further object of the present invention is the provision of a mechanism whereby the subscriber server may upgrade the selection criteria for assigning a serving call control server.

SUMMARY OF THE INVENTION

The above objects are accomplished in accordance with the present invention by the provision of a method according to claim 1, and enhanced servers according to claims 10, 20, 31 and 34 for carrying out a handover between a first and a second serving call control server assigned for servicing a user in a telecommunication network with a suitable set of capabilities, whilst ongoing sessions for the user, which were previously held at the first serving call control server, are kept alive.

There is thus provided a method for carrying out a handover between two serving call control servers in a telecommunication network, wherein a user accesses the network through a proxy call control server and is assigned with a first serving call control server for servicing the user, the first serving call control server having a set of capabilities suitable for fitting information elements in a user profile for the user. Therefore, the method includes a step of determining capabilities not provided by the first serving call control server to fit information elements in the user profile for the user; and a step of initiating a re-registration towards the user through the proxy call control server for assigning a second serving call control server.

In accordance with a first aspect of the present invention, the above step of initiating a re-registration also includes a step of keeping alive ongoing sessions and linked data for the user at both proxy call control server and serving call control server; and a step of indicating to the proxy call control server a handover between first and second call control servers for storing a reference to the second serving call control server.

In particular, the step of determining capabilities not provided by the first serving call control server may include a step of determining a change of information elements in the user profile for which the first serving call control function has no corresponding capability. These information elements might have change as a result of a user activity.

However, the step of determining capabilities not provided by the first serving call control server may also be encountered without any change of information elements in the user profile, but rather as a result of applying selection criteria for assigning a serving call control server. Therefore, the method may include in accordance with the invention a step of building up a canonical user profile that includes those information elements relevant to derive the set of capabilities that a serving call control server has; and a step of checking what portions of said canonical user profile are understood and supported by a serving call control server.

Moreover, the checking of the canonical user profile may be advantageously applied to the user profiles so that the method may also include a step of checking what portions of a user profile are understood and supported by a serving call control server, and this checking being applied to any serving call control server. In this respect, a step of checking what portions of a user profile, or what portions of a canonical user profile, are understood and supported by a serving call control server, preferably includes a step of receiving the profile in the serving call control server, and a step of returning a reference addressing each unsupported portion, or portion not understood in the profile.

Different advantages may be obtained from embodiments wherein alive ongoing sessions are served by a first serving call control server and new sessions for the user are served by a second serving call control server; and from other embodiments wherein the alive ongoing sessions and the new sessions for the user are served by the second serving call control server.

Preferably, the step of building up a canonical user profile is carried out at a subscriber server of the telecommunication network, the subscriber server being in charge of the user profile for each user.

Several entities co-operate in the telecommunication network to carry out the above method thanks to enhancements and novel contributions provided for by the present invention.

In this respect, there is provided a subscriber server in charge of a user profile for each user of the telecommunication network, the user profile including a number of information elements intended to fit a set of capabilities that a first serving call control server has for servicing the user. Such subscriber server includes means for determining capabilities not provided by the first serving call control server to fit information elements in the user profile; and means for initiating a de-registration of the first serving call control server.

In accordance with a second aspect of the invention, the subscriber server also includes means for receiving from the first serving call control server an indication of having ongoing sessions for the user; and means for providing an identifier of the first serving call control server towards the second serving call control server.

This subscriber server is arranged for co-operation in the above method, and thus the means for determining capabilities not provided by the first serving call control server may include means for determining a change of information elements in the user profile for which the first serving call control function has no corresponding capability.

Preferably, the subscriber server may also include means for building up a canonical user profile for the user that includes those information elements relevant to derive the set of capabilities that a serving call control server has and means for checking what portions of the canonical user profile are understood and supported by the serving call control server. For the sake of coherence, the subscriber server may also include means for checking what portions of a user profile are understood and supported by any serving call control server, and these means for checking the user profile, or the canonical user profile, preferably include means for sending the profile to the serving call control server, and means for receiving from said serving call control server a reference addressing each unsupported portion, or portion not understood in the profile.

Different advantages may be obtained in the above method depending on different arrangements in the subscriber server for providing the identifier of the first serving call control server to the second serving call control server. Thus, the means at the subscriber server for providing the identifier of the first serving call control server to the second serving call control server may include means for sending such identifier along with capabilities criteria to an intermediate network server in charge of assigning the second serving call control server, or may alternatively include means for directly providing the identifier of the first serving call control server along with the user profile for the user to the second serving call control server.

In addition, the subscriber server may be arranged in such manner that the means for receiving an indication of ongoing sessions for the user may include means for marking a handover process on course. Moreover, the subscriber server may additionally comprise means for receiving an indication from the second serving call control server to de-register the first serving call control server.

Also contributing to the above method there is provided a call control server suitable for acting as a serving call control server of a telecommunication network, the call control server being assigned for servicing a user and having a set of capabilities that fit information elements in a user profile for the user. The call control server includes means for receiving from a subscriber server that holds the user profile in the telecommunication network a de-registration order with an indication of a user re-registration for assigning a new call control server; and means for sending a user re-registration order towards an access server where the user has accessed the telecommunication network through.

In accordance with a third aspect of the invention, the call control server acting as a serving call control server includes means for notifying to the subscriber server the existence of ongoing sessions for the user; and means for keeping alive the ongoing sessions and linked data for the user.

This serving call control server preferably includes means for providing session information for the ongoing sessions to the new serving call control server once assigned for servicing the user within a handover procedure. I Therefore, a new assigned serving call control server includes means for receiving session information for ongoing sessions at a previously assigned call control server within a handover procedure. Moreover, a new assigned serving call control server additionally includes means for receiving an identifier of the previously assigned call control server.

In an advantageous embodiment, the new assigned serving call control server may include means for controlling the ongoing sessions for the user at a previously assigned call control server, whilst the latter remains on hook. Therefore, the previously assigned call control server includes means for transferring control over the ongoing sessions towards the new assigned call control server.

In another advantageous embodiment, the new assigned serving call control server may alternative include means for exchanging session information with respective call control servers and application servers involved for each session in order to replace the previously assigned call control server for handling the ongoing sessions for the user. Therefore, the previously assigned call control server includes means for transferring handling of the ongoing sessions towards the new assigned call control server. As a further advantage under this embodiment, and in order to maintain an advantageous co-operation with the above subscriber server, the new assigned serving call control server may include means for de-registering the previously assigned call control server towards the subscriber server.

Furthermore, a serving call control server in accordance with the invention may advantageously include means for receiving a user profile for the user, or a canonical user profile, from the subscriber server; means for checking what portions of user profile, or the canonical user profile, are understood and supported by the call control server; and means for returning a reference addressing each unsupported portion, or portion not understood in the user profile, or in the canonical user profile.

Also contributing to the above method there is provided an access server suitable for acting as a proxy call control server of a telecommunication network where a user accesses through, this access server has session information for ongoing sessions that the user has established with a serving call control server assigned for servicing the user. Therefore, this access server comprises means for storing session information for ongoing sessions for the user, linked with a reference to the serving call control server assigned for servicing the user.

In accordance with a fourth aspect of the invention, this access server also includes means for receiving an indication of handover between the serving call control server previously assigned and a new serving call control server assigned for servicing the user; and means for keeping alive the ongoing sessions and linked data for the user (UE).

In addition, this access server may be arranged in such manner that the means for keeping alive ongoing sessions may include means for storing a reference to the new serving call control server, means for linking the ongoing sessions thereto, and means for discarding a reference to the previously assigned serving call control server.

Alternatively to the latest arrangement, and for the sake of coherence with corresponding features in the above serving call control server, the access server may be arranged in such manner that the means for keeping alive ongoing sessions may include means for storing a reference to the new serving call control server, and means for linking thereto the ongoing sessions and a reference to the previously assigned serving call control server.

Further contributing to the above method there is provided an intermediate network server suitable for assigning a serving call control server for servicing a user in a telecommunication network, the assignation being based on a set of capabilities that each serving call control server has for servicing the user. This intermediate network server has means for receiving capabilities criteria for assigning a new serving call control server; and means for selecting the new serving call control server that better fits the capabilities criteria. In accordance with a fifth aspect of the invention, this intermediate network server also includes means for transmitting to the new assigned serving call control server an identifier of a previously assigned call control server for handover purposes.

BRIEF DESCRIPTION OF DRAWINGS

The features, objects and advantages of the invention will become apparent by reading this description in conjunction with the accompanying drawings, in which:

FIG. 1 illustrates a signalling flow sequence showing an existing procedure for re-assignment of a new server call control server for servicing a user when a previously assigned serving call control server is found to not have suitable capabilities.

FIG. 2 illustrates a first embodiment in accordance with the invention for enhancing the re-assignment of a new server call control server for servicing a user wherein the ongoing sessions for the user are kept alive without being released.

FIG. 3 shows a flow sequence describing a second embodiment in accordance with the invention for carrying out a handover between a first and a second serving call control server for servicing a user whilst previously ongoing sessions for the user are kept alive.

FIG. 4a in combination with a choice between FIG. 4b1 and FIG. 4b2, and combined with FIG. 4c1 show alternative third and fourth embodiments for carrying out a handover between a first and a second serving call control server for servicing a user whilst previously ongoing sessions for the user are kept alive; whereas FIG. 4a in combination with a choice between FIG. 4b3 and FIG. 4b4, and combined with FIG. 4c2 show other alternative fifth and sixth embodiments for a similar purpose.

FIG. 5 generally presents a basic architecture of an exemplary scenario, which includes entities and interfaces, where a subscriber server checks with a serving call control server what portions of the user profile are understood and supported by said serving call control server before allowing an upgrading of the user's terminal requested by the user from an application server. More particularly, FIG. 5 illustrates the checking between a subscriber server and a serving call control server of what portions of a user profile are understood and supported by the serving call control server.

FIG. 6 illustrates a basic diagram that includes entities and interfaces involved in a routing chain between a first user "A" and a second user "B", or between the first user and an application server, when no handover exists between two serving call control servers.

FIG. 7 illustrates how the basic diagram in FIG. 6 is modified in accordance with some embodiments of the invention for carrying out a handover between two serving call control servers. In particular, FIG. 7 shows the results achieved when carrying out the invention in accordance with third and fourth embodiments.

FIG. 8a also illustrates how the basic diagram in FIG. 6 is modified in accordance with some embodiments of the invention for carrying out a handover between two serving call control servers. In particular, FIG. 8a shows the results achieved when carrying out the invention in accordance with fifth and sixth embodiments.

FIG. 8b illustrates how a second handover can be carried out over the one shown in FIG. 8a and in accordance with fifth and sixth embodiments.

DETAILED DESCRIPTION OF PREFERRED EMBODIMENTS

The following describes some preferred embodiments for carrying out an effective handover in a telecommunication network between a first and a second serving call control servers assigned for servicing a user with a suitable set of capabilities, whilst ongoing sessions for the user previously held at the first serving call control server (S-CSCF-1) are kept alive, and new sessions for the user are only allowed to be established at the second serving call control server (S-CSCF-2).

In accordance with the present invention there is provided a new method and enhanced servers for re-assigning a second serving call control server (S-CSCF-2) for servicing a user when it is determined that said second serving call control server (S-CSCF-2) has capabilities required by the user that a previously selected first serving call control server (S-CSCF-1) does not have. The step of determining further capabilities that force a re-assignment of a second serving call control server (S-CSCF-2) is carried out between the first serving call control server (S-CSCF-1) downloading a user profile for the user and a subscriber server (HSS) that holds a user profile for each user of the telecommunication network. Several embodiments are provided in accordance with the invention whereby previously established and still ongoing sessions for the user in the first serving call control server (S-CSCF-1) are kept alive, thus achieving an effective handover procedure.

In a known solution applicable to the IMS and shown in FIG. 1, the re-assignment is initiated from a Home Subscriber Server (HSS) by sending a De-registration order (S-01) with an indication that a change of server is necessary (server change) to a firstly assigned Serving Call State Control Function entity (S-CSCF-1). The assigned Serving Call State Control Function entity carries out a release of ongoing sessions (C-01) for the user (UE), acknowledges back (S-02) to the Home Subscriber Server (HSS) such release, and sends (S-03) towards a Proxy Call State Control Function entity (P-CSCF) a notification of Re registration. Once the first Serving Call State Control Function entity (S-CSCF-1) has been de-registered in the Home Subscriber Server (HSS) and ongoing sessions released, the user (UE) initiates a new registration (S-05) towards the Proxy, which in turn consults (S-06) to an Interrogating Call State Control Function entity (I-CSCF) about the user. The Interrogating Call State Control Function entity requests new assignation criteria (S-07) to the Home Subscriber Server (HSS) that returns (S-08) a set of capabilities criteria derivable from information elements in the user profile for the user. The Interrogating Call State Control Function entity, with the received set of capabilities criteria, selects and assigns (S-09) a second Serving Call State Control Function entity (S-CSCF-2) for better servicing the user. This secondly assigned Serving Call State Control Function entity (S-CSCF-2) requests and obtains (S-10, S-11) a user profile for the user from the Home Subscriber Server (HSS), and confirms back (S-12) to the Interrogating Call State Control Function entity (I-CSCF) the new registration. The latter confirming (S-13) to the Proxy Call State Control Function entity (P-CSCF) such new registration, which makes the proxy discard references to the first Serving Call State Control Function entity (S-CSCF-1), store a reference to the new Serving Call State Control Function entity (S-CSCF-2), and then acknowledge (S-14) the registration to the user.

In a first embodiment of the present invention illustrated in FIG. 2, an alternative behaviour is proposed wherein a firstly assigned serving call control server (S-CSCF-1) responds with an indication (S-15) of still having ongoing sessions for the user to a De-registration order (S-01) sent from a subscriber server (HSS). This still assigned serving call control server (S-CSCF-1) waits until sessions are terminated (C-02), without allowing the user to establish any new session, and then de-registers (S-16) the user from the subscriber server (HSS) so that the re-assignment of a new serving call control server can go ahead. Once the subscriber server acknowledges (S-17) the procedure, the previously assigned serving call control server (S-CSCF-1) sends towards a proxy call control server (P-CSCF), where the user had accessed the telecommunication network through, a notification (S-03) of Re-registration, and the process of re-assignment continues in a similar manner as done for a pure IMS scenario. That is, the user registers (S-05) again to the proxy call control server (P-CSCF), said proxy communicates (S-06) with an intermediate network server (1-CSCF) that obtains (S-07, S-08) server capabilities from a subscriber server (HSS). The intermediate network server (1-CSCF) selects a new serving call control server (S-CSCF-2) for servicing the user based on these server capabilities, which are derivable from information elements included in a user profile held in the subscriber server for the user, and assigns (S-09) said serving call control server (S-CSCF-2) to the user. Then, the new assigned serving call control server (S-CSCF-2) requests (S-10) a download of the user profile to the subscriber server (HSS), obtains such user profile (S-11) and confirms (S-12) the assignation to the intermediate network server (I-CSCF). The intermediate network server (1-CSCF) confirms (S-13) to the proxy call control server (P-CSCF) such new registration, and said proxy discards references to the first call control server (S-CSCF-1), stores a reference to the second call control server (S-CSCF-2), and then acknowledges (S-14) the registration to the user.

In this quite simple first embodiment, the currently existing mechanism is improved by keeping alive the ongoing sessions, and the improvement may be enough in scenarios where not many new sessions are continuously established by the users. However, a user should preferably not be allowed to establish any new session in the old serving call control server (S-CSCF-1) and should wait for termination of the old ongoing sessions. Then, the user may register again for being assigned a new serving call control server (S-CSCF-2) where new sessions can be established.

In a second embodiment of the present invention, as FIG. 3 illustrates, an alternative method is provided to better accomplish users expectations in scenarios where the above situation is not acceptable. Under this approach, the firstly assigned serving call control server (S-CSCF-1) also responds to a De-registration order (S-01) sent from a subscriber server (HSS) with an indication (S-15) of still having ongoing sessions for the user, as done for the first embodiment. Nevertheless, under this second embodiment the still assigned serving call control server (S-CSCF-1) immediately sends a notification (S-03) of Re-registration towards the proxy call control server (P-CSCF) without waiting for termination of the ongoing sessions, which are kept alive. Then, the process of re-assignment continues as for the first embodiment until the new assigned serving call control server (S-CSCF-2) confirms (S-18) the assignation to the intermediate network server (I-CSCF). This confirmation implies a different further behaviour of the proxy call control server (P-CSCF) since the ongoing sessions for the user are still alive (C-03). The intermediate network server (I-CSCF) eventually confirms (S-19) to the proxy call control server (P-CSCF) the assignation of a new serving call control server (S-CSCF-2). Under this second embodiment, this confirmation (S-19) makes the proxy carry out a handover procedure (C-04) in order to keep references to, at least, the ongoing sessions, and preferably to the first serving call control server (S-CSCF-1) as well. Also under this handover procedure (C-04), the proxy call control server (P-CSCF) stores a reference to the second serving call control server (S-CSCF-2) and preferably links references to the ongoing sessions in the first serving call control server (S-CSCF-1) with said reference to the second serving call control server (S-CSCF-2) before confirming the registration (S-14) to the user (UE). Under this approach, the first serving call control server (S-CSCF-1) keeps ongoing sessions alive for the user and does not allow the establishment of any new session, whereas the second serving call control server (S-CSCF-2) allows the establishment of new sessions for the user and keeps them alive as for a normal operation. The proxy call control server (P-CSCF) is preferably responsible for distinguishing between old sessions and new sessions and for relating them to the first or second serving call control server (S-CSCF-1, S-CSCF-2).

Taking the above second embodiment as a basis, successive alternative embodiments are provided wherein two different approaches are shown for the second serving call control server (S-CSCF-2) being involved on keeping alive the ongoing sessions for the user in the first serving call control server (S-CSCF-1), and wherein other combinations of advantageous features are also described.

Under a third embodiment illustrated in the sequence diagram composed by FIG. 4a, followed by FIG. 4b1 and FIG. 4c1, a step (C-05) of marking a handover in process and storing an identifier (S-CSCF-1 id.) for the first serving call control server (S-CSCF-1) is carried out at the subscriber server (HSS) upon reception of an indication (S-15) from said first serving call control server (S-CSCF-1) of still having ongoing sessions for the user.

This identifier (S-CSCF-1 id.) is further provided to the second serving call control server (S-CSCF-2) for the latter being aware of the serving call control server (S-CSCF-1) currently in charge of previous ongoing sessions for the user. In a case where the subscriber server (HSS) is tightly coupled with the intermediate network server (1-CSCF), the identifier (S-CSCF-1 id.) may be sent (S-20) to the intermediate network server (I-CSCF) along with the capabilities criteria, as illustrated in FIG. 4b1 under this third embodiment. The intermediate network server (I-CSCF) selects a new serving call control server (S-CSCF-2) for servicing the user based on these capabilities criteria, which are derivable from information elements included in a user profile held in the subscriber server for the user, and sends (S-21) the identifier (S-CSCF-1 id.) of the first serving call control server (S-CSCF-1) to the new assigned serving call control server (S-CSCF-2).

Once the second serving call control server (S-CSCF-2), recently assigned for servicing the user, is aware of the first serving call control server (S-CSCF-1), by having received a corresponding identifier, several alternatives turn up in accordance with the invention for said second serving call control server (S-CSCF-2) being involved on the handling of previous ongoing sessions for the user (UE).

In accordance with this third embodiment and as FIG. 4b1 shows, the second serving call control server (S-CSCF-2) requests sessions information (S-22) about the ongoing sessions for the user from the first serving call control server (S-CSCF-1). Once such sessions information is received (S-23) from the first serving call control server (S-CSCF-1), the second serving call control server (S-CSCF-2) communicates (C-06) with all the respective call control servers and application servers involved for each session in order to exchange session information and let them know that the second serving call control server (S-CSCF-2) is from now on the one controlling the sessions for the user (UE). After this exchange of sessions information (C-06) has taken place, and as FIG. 4c1 shows, the previous ongoing sessions (C-03h) at the first serving call control server (S-CSCF-1) are now effectively handled by the second serving call control server (S-CSCF-2), which is now in charge of such ongoing sessions (C-03h). Provided that the exchange was successful and the ongoing sessions are now handled by the second serving call control server (S-CSCF-2), the latter de-registers (S-26) the first serving call control server (S-CSCF-1) from the subscriber server (HSS), which acknowledges (S-17) such de-registration. In an alternative embodiment not shown in this drawing, once the exchange of sessions information is successfully carried out, the first serving call control server (S-CSCF-1) is the one that sends a De-Register order (S-16) towards the subscriber server (HSS) and receive a corresponding acknowledge (S-17), instead of being the second serving call control server (S-CSCF-2) as FIG. 4c1 shows.

Then, the second serving call control server (S-CSCF-2) confirms (S-27) to the intermediate network server (1-CSCF) that a handover has been completed and that ongoing sessions for the user are now handled by said second serving call control server (S-CSCF-2). The intermediate network server passes this confirmation (S-28) to the proxy call control server (P-CSCF) for carrying out a handover procedure (C-09) that, under this third embodiment, stores a reference to the second serving call control server (S-CSCF-2), links references to the ongoing sessions for the user with said reference to the second serving call control server (S-CSCF-2), and discard the reference to the old first serving call control server (S-CSCF-1). Eventually, the proxy call control server (P-CSCF) acknowledges (S-14) the re-registration to the user (UE).

A fourth embodiment is provided as illustrated in the sequence diagram composed by FIG. 4a, followed by FIG. 4b2 and FIG. 4c1, wherein there is an alternative mechanism to the one shown in the third embodiment to provide an identifier (S-CSCF-1 id.) of the first serving call control server (S-CSCF-1) towards the second serving call control server (S-CSCF-2), for the latter being aware of the serving call control server (S-CSCF-1) currently in charge of previous ongoing sessions for the user. As shown in FIG. 4b2 for the fourth embodiment, the capabilities criteria provided (S-08) by the subscriber server (HSS) to the intermediate network node (I-CSCF) do not include the identifier (S-CSCF-1 id.) of the first serving call control server (S-CSCF-1), and neither does the intermediate network node (I-CSCF) when assigning (S-09) the second serving call control server (S-CSCF-2) to this re-registration. Instead, under this fourth embodiment the identifier (S-CSCF-1 id.) of the first serving call control server (S-CSCF-1) is directly sent (S-24) from the subscriber server (HSS) to the second call control server (S-CSCF-2) along with the user profile upon reception of corresponding request (S-10) from said second call control server (S-CSCF-2). Apart from the submission of the identifier (S-CSCF-1 id.), the third and fourth embodiments do not significantly differ from each other.

Further fifth and sixth embodiments are provided in accordance with the invention, as respectively illustrated in the sequence diagrams composed by FIG. 4a, followed by FIG. 4b3 and FIG. 4c2 for the former, and by FIG. 4a, followed by FIG. 4b4 and FIG. 4c2 for the latter.

Both fifth and sixth embodiments share with the third and fourth embodiments the features illustrated in FIG. 4a, including the step (C-05) of marking a handover in process and storing an identifier (S-CSCF-1 id.) for the first serving call control server (S-CSCF-1); and they also respectively share the two alternative mechanisms for providing the identifier (S-CSCF-1 id.) of the first serving call control server (S-CSCF-1) from the subscriber server (HSS) towards the second serving call control server (S-CSCF-2). Thus, as shown in FIG. 4b3, the fifth embodiment proposes the sending of such identifier (S-CSCF-1 id.) along with the capabilities criteria (S-20) from the subscriber server (HSS) to the intermediate network server (I-CSCF), and from the latter sent (S-21) towards the second serving call control server (S-CSCF-2), as done under the third embodiment. In a similar manner, and as shown in FIG. 4b4, the sixth embodiment proposes that such identifier (S-CSCF-1 id.) is sent (S-24) from the subscriber server (HSS) to the second serving call control server (S-CSCF-2) along with the user profile upon reception of corresponding request (S-10) from said second serving call control server (S-CSCF-2), as done under the fourth embodiment.

A difference between the third and fifth embodiments as well as between the fourth and sixth embodiments is the manner in which the first (S-CSCF-1) and second (S-CSCF-2) serving call control servers co-operate to keep alive the ongoing sessions for the user.

Under the third and fourth embodiments, the second serving call control server (S-CSCF-2) requests (S-22) and obtains (S-23) sessions information for the ongoing sessions from the first serving call control server (S-CSCF-1), and exchanges session information (C-06) with all the respective call control servers and application servers involved for each session. By doing this, the second serving call control server (S-CSCF-2) can fully replace the first serving call control server (S-CSCF-1) for handling the ongoing sessions for the user, so that the said first serving call control server (S-CSCF-1) can be de-registered and disappears from the routing chain. This mechanism involving the routing chain of signalling traffic is illustrated in FIG. 7 with due regard to a normal routing chain shown in FIG. 6 wherein no handover occurs. As FIG. 7 shows, when the second serving call control server (S-CSCF-2) has requested (S-22) session information for exchanging with other call control servers (S-CSCF-B, P-CSCF-B) and application servers (AS), the final result achieved after handover is that the first serving call control server (S-CSCF-1) has disappeared from the routing chain.

However, under the fifth and sixth embodiments there is provided an alternative mechanism whereby the first serving call control server (S-CSCF-1) does not disappear from the routing chain but rather places the second serving call control server (S-CSCF-2) hierarchically on top, by transparently transferring to said second serving call control server (S-CSCF-2), firstly, all the signalling received from the proxy call control server (P-CSCF) and intended for other call control servers and application servers involved for a user session and, secondly, all the signalling received from the other call control servers and application servers and intended for the proxy call control server (P-CSCF). The signalling transferred to the second serving call control server (S-CSCF-2) is processed therein, in light of the capabilities such second serving call control server (S-CSCF-2) has, and proper responses are returned back to the first serving call control server (S-CSCF-1) for the latter to transparently submit them towards the originally intended destination. This alternative mechanism involving the routing chain of signalling traffic is illustrated in FIG. 8a with due regard to the normal routing chain shown in FIG. 6 wherein no handover occurs. As FIG. 8a shows, when the second serving call control server (S-CSCF-2) has requested (S-25) to be on-hook there is no need to exchange references and sessions information with other call control servers and application servers but rather placing the second serving call control server (S-CSCF-2) hierarchically on top of the first serving call control server (S-CSCF-1), the former fully controlling the session whereas the latter simply transferring the signalling received from the proxy call control server (P-CSCF) in our own network or from the other call control servers (S-CSCF-B, P-CSCF-B) and application servers (AS). Under this approach there is no so much signalling to be exchanged in the network during handover from a first to a second serving call control servers, though more network servers may be in use for servicing a user. Still further under this approach, FIG. 8b shows how another handover may be carried out from the second to a third serving call control server (S-CSCF-3) without needing to further exchange references with the other call control servers (S-CSCF-B, P-CSCF-B) and application servers (AS) as the case would be as following the approach illustrated in FIG. 7, and described for the third and fourth embodiments.

Therefore, as illustrated in FIG. 4b3 and FIG. 4b4 for the fifth and sixth embodiments respectively, and after having received the user profile (S-11, S-24) for the user and the identifier (S-21, S-24) of the first serving call control server (S-CSCF-1), the second serving call control server (S-CSCF-2) sends a request for being on-hook (S-25) towards the first serving call control server (S-CSCF-1) identified by said identifier (S-CSCF-1 id.). Upon reception of sessions information (S-23) from the first serving call control server (S-CSCF-1), the second serving call control server (S-CSCF-2) carries out an internal handover procedure (C-07) to prepare itself for controlling the ongoing sessions for the user that were previously handled from the first serving call control server (S-CSCF-1). Then, the second serving call control server (S-CSCF-2) can confirm (S-18) the assignation to the intermediate network server (I-CSCF), as already described for the above second embodiment. As shown in FIG. 4c2, the intermediate network server (I-CSCF) also confirms (S-19) to the proxy call control server (P-CSCF) this assignation of a new serving call control server (S-CSCF-2). As for the second embodiment, also under the fifth and sixth embodiments this confirmation (S-19) makes the proxy carry out a handover procedure (C-04) that keeps references to the ongoing sessions, and likely to the first serving call control server (S-CSCF-1) as well, stores a reference to the second serving call control server (S-CSCF-2) and, preferably, links the latter with references to the ongoing sessions before confirming the registration (S-14) to the user (UE).

Under this approach, both first and second serving call control servers (S-CSCF-1, S-CSCF-2) are aware when a session for the user finishes (C-08). However, even though the second serving call control server (S-CSCF-2) is the one controlling the sessions, it is the first serving call control server (S-CSCF-1) the one to be de-registered, and thus the one to preferably send a De-Register order (S-16) to the subscriber server. Upon reception of the corresponding acknowledge (S-17) from the subscriber server, the first serving call control server (S-CSCF-1) sends a notification of De-Registration (S-29) towards the proxy call control server (P-CSCF), the latter deleting (C-10) the reference stored to said first serving call control server (S-CSCF-1) and possible links with other references to the second serving call control server (S-CSCF-2). In this respect, one may notice that both first serving call control server (S-CSCF-1) and second serving call control server (S-CSCF-2) may be arranged for being the one triggering the de-registration (S-26; S-16) of the first serving call control server (S-CSCF-1) towards the subscriber server (HSS) and irrespective of the other choices shown in the third to sixth embodiments.

The invention also provides a mechanism particularly illustrated in FIG. 5 whereby a serving call control server (S-CSCF-1; S-CSCF-2) may report (S-33) what portions of a user profile are not understood or not supported. In principle, the user profile might be received (S-32) directly from a subscriber server (HSS) of the telecommunication network, upon request from said serving call control server (S-CSCF-1; S-CSCF-2), or as a result of a pushing from the subscriber server (HSS) itself; or the user profile might be received as well from a Provisioning System, or from an Operator and Maintenance System, or from any other system (not shown in any drawing) that is arranged to provide user profiles, with information elements as described throughout the present specification, to the serving call control servers (S-CSCF-1; S-CSCF-2). Such report received from the serving call control servers (S-CSCF-1; S-CSCF-2) may be used by the subscriber server (HSS), likely in cooperation with an intermediate network server (I-CSCF), to trigger a re-assignment of a new serving call control server (S-CSCF-1; S-CSCF-2; S-CSCF-3) for servicing the user (UE; UE-A).

Prior to initiating the re-assignment, the subscriber server (HSS) preferably checks whether there is a serving call control server (S-CSCF-1; S-CSCF-2; S-CSCF-3) in the telecommunication network with the required capabilities. To this end, the subscriber server may build up a so-called "canonical user profile" that may be downloaded to all the serving call control servers (S-CSCF-1; S-CSCF-2; S-CSCF-3) in the telecommunication network. The canonical user profile includes those information elements (standard and proprietary elements) in the user profile that map into a set of server capabilities defined by the operator of the telecommunication network. The subscriber server may push a download of this canonical user profile towards any serving call control server, at any time though preferably under low traffic conditions, for finding out the capabilities that each serving call control server has, and not only for re-assigning a new serving call control server.

Thus, thanks to this mechanism provided by the present invention, whereby a canonical user profile is downloaded to the serving call control servers (S-CSCF-1; S-CSCF-2; S-CSCF-3) and respective reports are obtained from them indicating the unsupported or not understood portions, the holder of user profiles, likely a subscriber server (HSS), or a Network Operator's Provisioning System, or an Operation and Maintenance System can be aware of what portions of a canonical user profile are not supported, when each serving call control servers (S-CSCF-1; S-CSCF-2; S-CSCF-3) sets up a network connection with the subscriber server to negotiate server capabilities for further servicing users.

In an exemplary embodiment where the user profile, or a canonical user profile, is issued following rules and syntax for an extensible Markup Language (hereinafter referred to as XML) document, a so-called Xpath language can be used to indicate what portions of the profile are not supported or not understood.

In this respect, XPath is a known language for addressing specific parts of an XML document. Xpath views an XML document as a tree of nodes; wherein each node may represent an element, an attribute, an element's text value, a comment, or the like in the XML document. Therefore, XPath defines a non-XML syntax for expressions that identify particular nodes and groups of nodes, namely node-sets in an XML document. Even though XPath provides basic facilities for manipulation of strings, numbers and Booleans, the most significant contribution of XPath for the purpose of the invention is the so-called "Location Path". A Location Path is evaluated to yield a node-set. A node-set is a collection of zero or more nodes from and XML document. Location Paths comprise a number of Location Steps, which are evaluated in sequence. Input to one Location Step is the node-set returned by a previous Location Step. Each Location Step is itself a relative Location Path. A context node, against which a first Location Path is evaluated, is established by means not provided by Xpath, but rather provided by the present invention.

Thus, the present invention provides means for addition of new protocol parameters to a protocol used for communication between the subscriber server (HSS) and the serving call control server (S-CSCF-1; S-CSCF-2; S-CSCF-3). For example, a nowadays-preferred protocol for communicating the subscriber server with the serving call control servers may be "Diameter". Under this exemplary embodiment, a new Attribute-Value Pair (hereinafter AVP) "Non-Supported-User-Data" is introduced for the serving call control servers (S-CSCF-1; S-CSCF-2; S-CSCF-3) reporting a portion of a user profile, or a portion of a canonical user profile, not supported or not understood at the serving call control servers as a result of a profile download from the subscriber server (HSS). Moreover, another new AVP may be the above commented Location-Xpath, as shown in the Table I below.

TABLE I

```
< Push-Profile-Answer >::=< Diameter Header: 305, 167772151 >
    < Session-Id >
    { Vendor-Specific-Application-Id }
    [ Result-Code ]
    [ Experimental-Result ]
    [ Non-Supported-User-Data ]
    { Auth-Session-State }
    { Origin-Host }
    { Origin-Realm }
    *[ AVP ]
    *[ Proxy-Info ]
    *[ Route-Record ]
```

| | |
|---|---|
| AVP | Non-Supported-User-Data |
| Type | Grouped |
| Description | This AVP describes the parts of the user profile that the S-CSCF received from the HSS and that are not supported by the S-CSCF. |
| Syntax | Non-Supported-User-Data ::= <AVP header: TBD> 1* [Location-XPath] * [AVP] |

TABLE I-continued

| | |
|---|---|
| AVP | Location-Xpath |
| Type | OctetString |
| Description | This AVP describes a single piece of the user profile that the S-CSCF received from the HSS and that is not supported by the S-CSCF. |
| Syntax | This AVP contains a location path expression compliant with "XML Path Language (Xpath) Version 1.0". The following conditions apply: Context node is the root node of the XML Document contained in the User-Data AVP of the Push-Profile-Request command The location path shall evaluate to a node-set. The node-set includes one or more nodes of the XML Document contained in the User-Data AVP that are not supported or understood by the receiver of the Push-Profile-Request command |

In the above Table I, the square brackets "[", "]" indicate that the new AVP is optional at protocol level, and may thus not be always present.

Apart from the above additions, a new result code is provided in accordance with the invention for the serving call control server (S-CSCF-1; S-CSCF-2; S-CSCF-3) responding the subscriber server upon a user profile download.

Under this exemplary embodiment, a new result code DIAMETER_ERROR_UNSUPPORTED_USER_DATA is preferably used with indication of three possible reasons. A first reason may be a parsing error due to a malformed XML document, or well-formed document that cannot be matched against an available scheme; a second reason may be the detection of non-supported trigger criteria; and a third reason may be the detection of proprietary elements, namely the so-called extended elements, that are not understood. For the former reason, the response message does not need to report detailed information since the analysis of the whole XML document fails. However, for the two latter, detection of non-supported trigger criteria and detection of proprietary elements not understood, the corresponding information element is reported according to the rules in the above Table I with as many Location-Xpath statements as information elements are not supported or understood. Each Location-Xpath preferably evaluates an element, attribute or element value of the XML document representing the user profile for the user, or the canonical user profile, that is not supported or understood by the serving call control server (S-CSCF-1; S-CSCF-2; S-CSCF-3).

In an exemplary scenario already commented above, where a user (UE) had accessed the telecommunication network through a proxy call control server (P-CSCF), and had been assigned a serving call control server (S-CSCF-1) with suitable capabilities for servicing the user, the user might further access an Application Server (AS) offering to the user an upgrade of the user's terminal by downloading a software prepared to this end. This scenario is appropriate for presenting an advantageous use of another aspect of the present invention illustrated in FIG. 5.

As FIG. 5 shows, once the user (UE) has requested the user's terminal upgrading (S-30) and before accepting the upgrade, the application server (AS) communicates (S-31) directly, or through an intermediation system such as a provisioning system, with a subscriber server (HSS) in order to update the user profile, the subscriber server being in charge of user profiles for users of the telecommunication network. The updating of the user profile may imply an addition of a new trigger in the user profile, or a change of related triggering information, or an addition of a new information element to the user profile such as a new codec. The subscriber server (HSS) updates (S-34, S-35) the user profile, or builds up a canonical user profile with the changed and unchanged information elements in the user profile, and pushes (S-32) a user profile download towards the serving call control server (S-CSCF-1). The latter responds with a confirmation (S-33) indicating whether the new user profile is fully understood and supported, or with those portions of the user profile, or canonical user profile, that are not understood or supported in the serving call control server (S-CSCF-1). With this information the subscriber server (HSS) can determine additional capabilities that are required for servicing the user from a serving call control server (S-CSCF). The subscriber server might check that there are other serving call control servers (S-CSCF-2; S-CSCF-3), which is not shown in FIG. 5, by pushing the download (S-32) of the user profile, or canonical user profile, towards these other serving call control servers (S-CSCF-2; S-CSCF-3) candidates for servicing the user. Once a serving call control server (S-CSCF-1) is found appropriate for servicing the user, the subscriber server saves the updated user profile, and may respond (S-36) to the application server (AS) with a confirmation of upgrading the user's terminal. If no serving call control servers (S-CSCF-1; S-CSCF-2; S-CSCF-3) is found with the required server capabilities, the subscriber server (HSS) may reject (S-36) such upgrading. Eventually, the application server (AS) responds (S-37) towards the user's terminal (UE) with a successful confirmation or with a reject of the requested operation. This mechanism may also be used by an operator of the telecommunication network for configuring the network according to a predefined set of capabilities that the serving call control servers have for servicing users of said telecommunication network.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A method for carrying out a handover between two serving call control servers in a telecommunication network, wherein a user accesses the network through a proxy call control server and is assigned with a first serving call control server for servicing the user, the first serving call control server having a set of capabilities suitable for fitting information elements in a user profile for the user, the method including the steps of:

determining, by the first serving call control server, capabilities not provided by the first serving call control server to fit information elements in the user profile for the user; and initiating, by the first serving call control server, a re-registration towards the user through the proxy call control server for assigning a second serving call control server, the initiating the re-registration further comprising:

providing, by the first serving call control server, a first serving call control server identifier for sending towards the assigned second serving call control server;

receiving, by the first serving call control server, a request for its going sessions from the assigned second serving call control server;

providing, by the first serving call control server, session information for its ongoing sessions to the assigned second serving call control server in response to the request, to keep alive the ongoing sessions and linked data for the user at both the proxy call control server and the second serving call control server; and indicating, by the first serving call control server, to the proxy call control server, a handover between first and second call control servers for storing a reference to the second serving call control server linked with references to the ongoing sessions.

2. The method of claim 1, wherein the determining capabilities step includes a step of determining a change of information elements in the user profile for which the first serving call control function has no corresponding capability.

3. The method of claim 1, further comprising the steps of:
building up a canonical user profile that includes those information elements relevant to derive the set of capabilities that a serving call control server has; and
checking what portions of the canonical user profile are understood and supported by a serving call control server.

4. The method of claim 1, further comprising a step of checking what portions of a user profile are understood and supported by a serving call control server.

5. The method of claim 1, further comprising a step of controlling the ongoing sessions for the user at first call control server, whilst the first call control server remains on hook.

6. The method of claim 1, wherein new sessions for the user are served by the second serving call control server.

7. The method of claim 3, wherein the step of building up a canonical user profile is carried out at a subscriber server of the telecommunication network, the subscriber server being in charge of the user profile for the user.

8. The method of claim 3, wherein the step of checking includes a step of receiving the canonical user profile in the serving call control server, and a step of returning a reference addressing each unsupported portion, or portion not understood in the canonical user profile.

9. The method of claim 4, wherein the step of checking includes a step of receiving the user profile in the serving call control server, and a step of returning a reference addressing each unsupported portion, or each portion not understood in the user profile.

10. A call control server acting as a serving call control server of a telecommunication network, the call control server being assigned for servicing a user and having a set of capabilities that fit information elements in a user profile for the user, the call control server comprising:

means for receiving from a subscriber server that holds the user profile in the telecommunication network a de-registration order with an indication of user re-registration for assigning a new call control server (S-CSCF-2);

means for sending a user re-registration order towards an access server through which the user has accessed the telecommunication network means for notifying to the subscriber server of the existence of ongoing sessions for the user;

means for providing a serving call control server identifier for sending towards the new call control server;

means for receiving a request for its ongoing sessions from the new call control server;

means for providing session information for the ongoing sessions to the new call control server assigned for servicing the user in response to the request from the new call control server within a handover procedure; and means for keeping alive the ongoing sessions and linked data for the user at the call control server, until a handover to the new call control server is completed or until the ongoing sessions end, whichever occurs first.

11. The call control server of claim 10 further comprising means for receiving a request from the new call control server to provide session information for the ongoing sessions.

12. The call control server of claim 11 further comprising means for transferring control over the ongoing sessions towards the new assigned call control server whilst the call control server remains on hook.

13. The call control server of claim 11 further comprising means for transferring handling of ongoing sessions towards the new assigned call control server, the call control server being de-registered towards the subscriber server.

14. The call control server of claim 10 further comprising means for receiving session information for ongoing sessions at a previously assigned call control server within a handover procedure.

15. The call control server of claim 14 further comprising means for receiving an identifier of the previously assigned call control server.

16. The call control server of claim 15 further comprising means for controlling the ongoing sessions for the user at the previously assigned call control server, whilst the previously assigned call control server remains on hook.

17. The call control server of claim 15 further comprising means for exchanging session information with respective call control servers and application servers involved for each session in order to replace the previously assigned call control server for handling the ongoing sessions for the user.

18. The call control server of claim 17 further comprising means for de-registering the previously assigned call control server towards the subscriber server.

19. The call control server of claim 10 further comprising:
means for receiving a user profile for the user from the subscriber server;
means for checking what portions of the user profile are understood and supported by the call control server; and
means for returning a reference addressing each unsupported portion, or portion not understood in the user profile.

20. The call control server of claim 10 further comprising:
means for receiving a canonical user profile from the subscriber server;
means for checking what portions of the canonical user profile are understood and supported by the call control server; and
means for returning a reference addressing each unsupported portion, or portion not understood in the canonical user profile.

\* \* \* \* \*

UNITED STATES PATENT AND TRADEMARK OFFICE
CERTIFICATE OF CORRECTION

PATENT NO. : 9,344,923 B2  
APPLICATION NO. : 11/573672  
DATED : May 17, 2016  
INVENTOR(S) : Pallares Lopez et al.

It is certified that error appears in the above-identified patent and that said Letters Patent is hereby corrected as shown below:

In the Specification

In Column 2, Line 39, delete "(1-CSCF)" and insert -- (I-CSCF) --, therefor.

In Column 6, Line 13, delete "procedure. I" and insert -- procedure. --, therefor.

In Column 9, Line 36, delete "(1-CSCF)" and insert -- (I-CSCF) --, therefor.

In Column 9, Line 38, delete "(1-CSCF)" and insert -- (I-CSCF) --, therefor.

In Column 9, Line 48, delete "(1-CSCF)" and insert -- (I-CSCF) --, therefor.

In Column 10, Line 60, delete "(1-CSCF)," and insert -- (I-CSCF), --, therefor.

In Column 11, Line 41, delete "(1-CSCF)" and insert -- (I-CSCF) --, therefor.

In the Claims

In Column 18, Line 2, in Claim 1, delete "going" and insert -- ongoing --, therefor.

In Column 18, Line 59, in Claim 10, delete "network" and insert -- network; --, therefor.

Signed and Sealed this  
Ninth Day of August, 2016

Michelle K. Lee  
*Director of the United States Patent and Trademark Office*